United States Patent
Yu (10) Patent No.: US 9,354,135 B2
(45) Date of Patent: May 31, 2016

(54) OIL LEAK DETECTION DEVICE

(76) Inventor: Hong Geun Yu, Gyeonggi-do (KR)

( * ) Notice: Subject to any disclaimer, the term of this patent is extended or adjusted under 35 U.S.C. 154(b) by 303 days.

(21) Appl. No.: 13/981,447

(22) PCT Filed: Mar. 26, 2012

(86) PCT No.: PCT/KR2012/002180
§ 371 (c)(1),
(2), (4) Date: Jul. 24, 2013

(87) PCT Pub. No.: WO2013/022165
PCT Pub. Date: Feb. 14, 2013

(65) Prior Publication Data
US 2013/0305815 A1 Nov. 21, 2013

(30) Foreign Application Priority Data
Aug. 5, 2011 (KR) .................. 10-2011-0078139

(51) Int. Cl.
*G01M 3/16* (2006.01)
*G01M 3/18* (2006.01)
*G01M 3/04* (2006.01)

(52) U.S. Cl.
CPC .............. *G01M 3/165* (2013.01); *G01M 3/045* (2013.01); *G01M 3/18* (2013.01)

(58) Field of Classification Search
CPC ........ G01M 3/045; G01M 3/165; G01M 3/18
USPC .................................. 73/40, 49.1, 49.2, 590
See application file for complete search history.

(56) References Cited

U.S. PATENT DOCUMENTS

| 4,677,371 A * | 6/1987 | Imaizumi ............. | G01M 3/165 |
| | | | 174/11 R |
| 4,801,865 A * | 1/1989 | Miller .................. | G01N 33/246 |
| | | | 324/609 |
| 2007/0046481 A1* | 3/2007 | Vokey ................... | E04D 13/006 |
| | | | 340/602 |
| 2009/0173143 A1* | 7/2009 | Yu ......................... | G01M 3/165 |
| | | | 73/40 |

FOREIGN PATENT DOCUMENTS

| KR | 10-0827385 B1 | 5/2008 | | |
| KR | 10-2011-0007501 A | 1/2011 | | |
| KR | 2011007501 A | * | 1/2011 | ............. G01M 3/26 |
| KR | 20110007501 A | * | 1/2011 | ............. G01M 3/26 |
| KR | 10-2011-0035232 A | 4/2011 | | |
| KR | 2011035232 A | * | 4/2011 | ............. G01M 3/16 |
| KR | 20110035232 A | * | 4/2011 | ............. G01M 3/26 |

* cited by examiner

*Primary Examiner* — Laura Martin
*Assistant Examiner* — Suman K Nath
(74) *Attorney, Agent, or Firm* — Rabin & Berdo, P.C.

(57) ABSTRACT

The present invention relates to an oil leak detection device. In an aspect, the oil leak detection device includes a base film layer 200 configured in a tape form, a pair of polymer lines 220, 230 formed on a top surface of the base film layer in parallel in a length direction, a pair of conductive lines 210, 240 formed on the top surface of the base film layer in parallel to the pair of polymer lines in the length direction, and an upper protection film layer 300 attached to the top surface of the base film layer and configured to have a plurality of sensing holes 310 formed at specific intervals in the length direction at locations through which only one of the pair of polymer lines is exposed.

2 Claims, 8 Drawing Sheets

OIL LEAK DETECTION DEVICE

TECHNICAL FIELD

The present invention relates to an oil leak detection device and, more particularly, to an oil leak detection device directly attached to an oil pipeline, an oil tank, or a supply pipe, such as the place where oil is expected to leak, in a tape manner and configured to detect leaking oil and determine whether or not oil leaks simply and precisely.

BACKGROUND ART

Leak sensors using various methods for sensing oil leak are being used. The applicant of the present invention already proposed an oil leak detection device, such as that shown in FIG. 10 of Korean Patent Application No. 10-2009-0065050.

Figure 10:
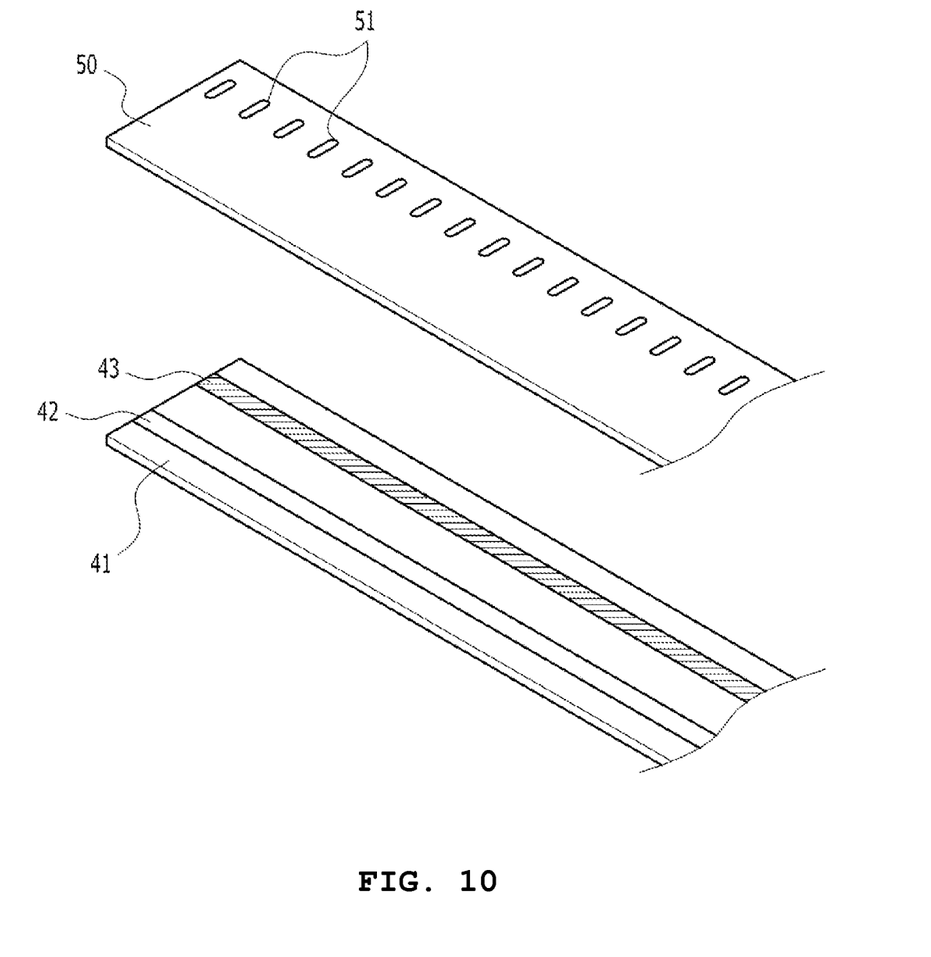
FIG. 10 is a diagram showing the structure of a conventional oil leak detection device.

In the oil leak detection device, a conductive line 42 made of a silver compound or pure conductive ink having 0 to 20Ω is printed on a top surface of a base film layer 41 formed of a film, such as PET, PE, PTFE, or PVC in a length direction. A conductive polymer line 43 is attached to the top surface of the base film layer 41 and is spaced apart from the conductive line 42 at a specific interval in parallel to the conductive line 42.

The conductive polymer line 43 reacts to oil, such as hydrocarbone liquid, and detects whether or not oil leak has occurred by sensing a change of a resistance value due to the reaction.

An upper protection film layer 50 is stacked over the base film layer 41. A plurality of holes 51 is formed in the upper protection film layer 50 at specific intervals in a length direction, and the holes 51 are formed at the same location as the location where the conductive polymer line 43 is attached.

Accordingly, when oil flows in through the holes 51 of the upper protection film layer 50, the volume of the conductive polymer line 43 is increased by the porosity of the conductive polymer line 43 and thus a resistance value is increased.

As a result, a controller determines whether or not oil has leaked by reading a change of a resistance value.

However, the conventional oil leak detection device has a high probability that an error can occur because the conductive polymer line 43 for sensing oil leak is very sensitive to a change of temperature.

That is, the conventional oil leak detection device is problematic in that oil leak is erroneously determined because a resistance value is changed due to an increase in the volume of the conductive polymer line 43 although oil leak is not generated when temperature rises due to a change of surrounding environments.

DISCLOSURE

Technical Problem

Accordingly, the present invention has been made keeping in mind the above problems occurring in the prior art, and an object of the present invention is to provide an oil leak detection device, wherein a pair of polymer lines are formed in parallel on a tape base, only one of the polymer lines detects oil, and the other of the polymer lines functions as a reference line for a change of a resistance value attributable to a change of temperature and precisely detects oil leak irrespective of a change of temperature.

Technical Solution

In order to achieve the above object, an oil leak detection device includes a base film layer configured in a tape form, a pair of polymer lines formed on a top surface of the base film layer in parallel in a length direction, a pair of conductive lines formed on the top surface of the base film layer in parallel to the pair of polymer lines in the length direction, and an upper protection film layer attached to the top surface of the base film layer and configured to have a plurality of sensing holes formed at specific intervals in the length direction at locations through which only one of the pair of polymer lines is exposed.

Advantageous Effects

As described above, in accordance with the oil leak detection device of the present invention, reliability can be improved because oil leak can be stably sensed by the polymer line even in a place having a severe change of temperature. Accordingly, an error in generating an oil leak alarm due to a change of surrounding environment can be prevented.

MODE FOR INVENTION

An oil leak detection device in accordance with the present invention is described in detail with reference to the accompanying drawings.

Figure 1:
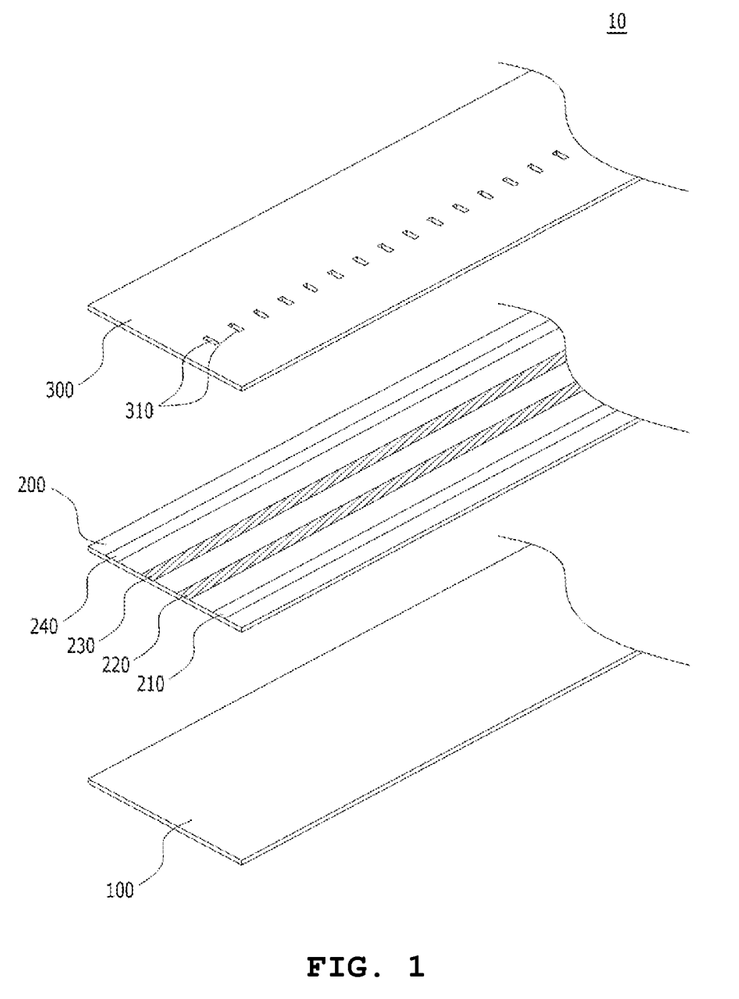
FIG. 1 is a perspective view of the present invention which is exploded for each layer.

FIG. 1 is a diagram showing the cross section of an oil leak sensor 10 in accordance with an embodiment of the present invention. The oil leak sensor 10 is configured in a tape form in such a way as to be attached to a floor, the surface of a wall, or the outside of a pipe. The oil leak sensor 10 includes an attachment layer 100, a base layer 200, and an upper protection layer 300 which are sequentially stacked from the bottom to the top.

The attachment layer 100 is attached to a place where oil leak is expected to occur and is formed of an adhesive tape, such a double-sided tape.

A pair of conductive lines 210 and 240 made of a silver compound or pure conductive ink having 0 to 20Ω are printed on a top surface of the base layer 200 formed of a film, such as PET, PE, PTFE, or PVC, in a length direction or the pair of conductive lines 210 and 240 made of pure copper, stainless, or iron line having a thin pole form are attached to the top surface of the base layer 200 using an adhesive. A pair of polymer lines 220 and 230 are attached to the top surface of the base layer 200 and are spaced apart from the conductive lines 210 and 240 at specific intervals in parallel to the conductive lines 210 and 240.

The polymer lines 220 and 230 preferably are formed in close proximity, and the conductive lines 210 and 240 are formed outside the polymer lines 220 and 230.

Furthermore, the other ends of the first conductive line 210 and the first polymer line 220 are electrically coupled by a connector, and the other ends of the second conductive line 240 and the second polymer line 230 are also electrically coupled likewise. The polymer lines 220 and 230 can be made of porous or conductive polymer.

Each of the polymer lines 220 and 230 reacts to oil, such as hydrocarbon liquid, and detects whether or not oil leak has occurred by sensing a change of a resistance value due to the reaction.

A method of attaching the polymer lines 220 and 230 to the base layer 200 can include a variety of methods, such as those using an adhesive, ultrasonic fusion, and thermal compression. The polymer lines 220 and 230 can be attached the top surface of the base layer 200 simultaneously with the upper protection layer 300 when the upper protection layer 300 is attached to the top surface of the base layer 200.

The upper protection layer 300 is placed over the base layer 200. A plurality of sensing holes 310 is formed in the upper protection layer 300 at specific intervals in a length direction so that only one (e.g., the polymer line 220) of the pair of polymer lines 220 and 230 is exposed externally as in FIG. 2.

Figure 2:
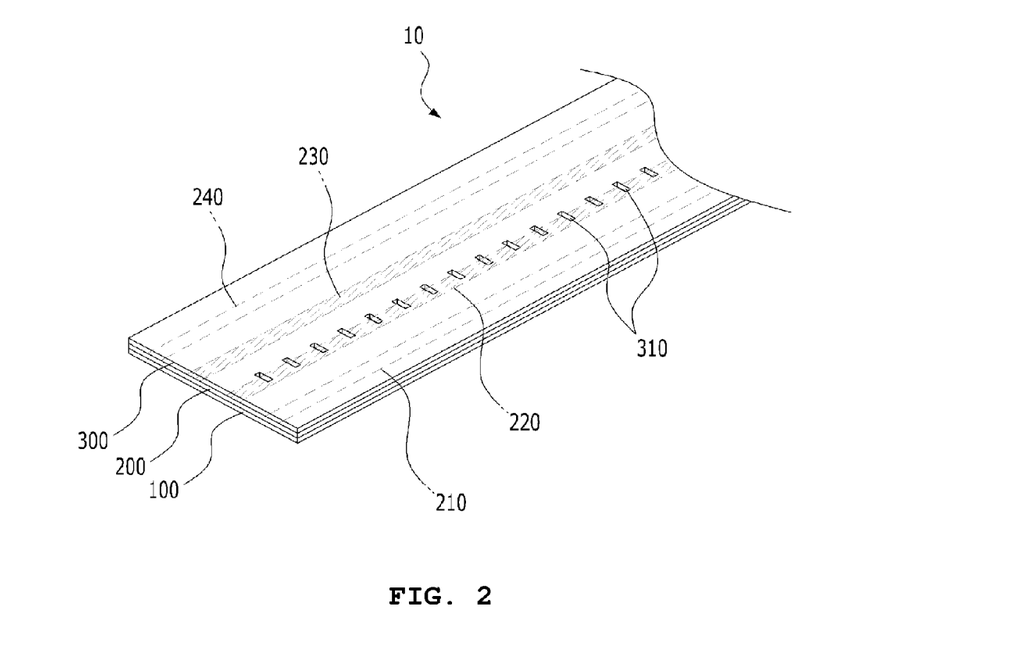
FIG. 2 is a diagram showing a positional relationship between a polymer line and holes.

The polymer line 230 not exposed through the sensing holes 310 becomes a reference line for sensing a change of temperature.

Furthermore, the base layer 200 and the upper protection layer 300 stacked as described above are adhered together using thermal compression, ultrasonic fusion, or an adhesive. Here, parts other than the sensing holes 310, the conductive lines 210 and 240, and the polymer lines 220 and 230 are adhered, and the attachment layer 100 can be further attached to the bottom of the base layer 200.

Figure 3:
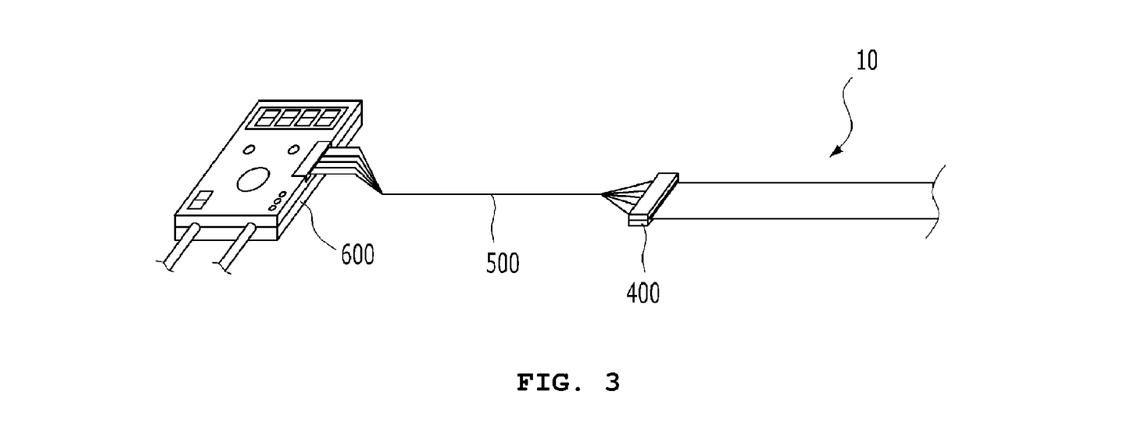
FIG. 3 is a diagram showing a state in which a controller and an oil leak detection device are coupled.

A process of sensing oil leak is described below. As shown in FIG. 3, the oil leak sensor 10 couples the conductive lines 210 and 240 and a signal line 500 through a connector 400 so that the conductive lines 210 and 240 and a signal line 500 are connected to a controller 600.

Figure 4:
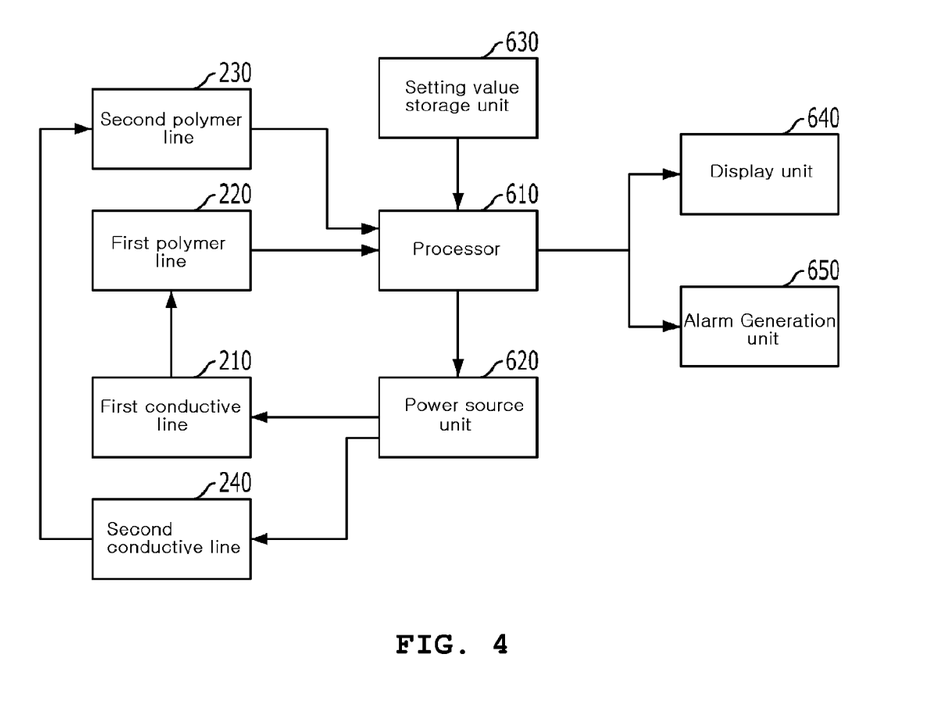
FIG. 4 is a block diagram showing an internal circuit of a controller.

As shown in FIG. 4, the processor 610 of the controller 600 controls a power source unit 620 so that the power source unit 620 supplies the first conductive line 210 with voltage having several V and determines whether oil leaks or not based on a voltage value from the first polymer line 220. When oil leak is generated and oil enters the sensing holes 310, the volume or the amount of adsorption of the first polymer line 220 is increased, so a resistance value in the first polymer line 220 is increased.

As a result, voltage drops, and the processor 610 determines that oil leaks based on the voltage drop.

Here, a voltage drop value that may occur depending on the length of the oil leak sensor 10 is previously set in a setting value storage unit 630 because voltage inputted to the processor 610 indispensably drops depending on the length of the oil leak sensor 10. If a voltage drop value sensed by the first polymer line 220 is higher than the set voltage drop value, the processor 610 determines that oil leaks and outputs an alarm signal through a display unit 640 and an alarm generation unit 650 in order to inform a manager that oil has leaked.

Meanwhile, an error in sensing oil leak is frequently generated because the first polymer line 220 is made of polymer materials sensitive to temperature and thus sensitive to a change of external temperature. Accordingly, there is a need for a structure for compensating for the frequent error.

Figure 5:
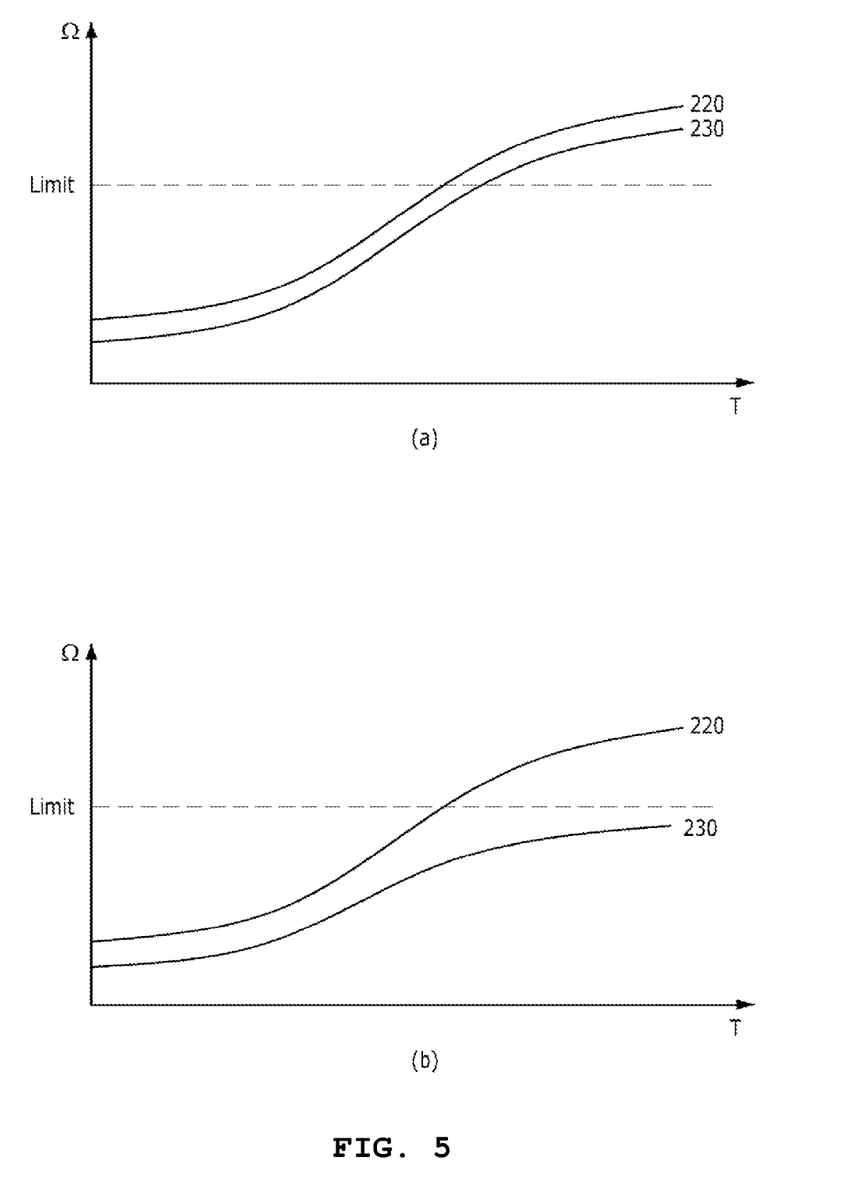
FIG. 5 is a graph showing a change in the resistance value of a polymer line attributable to a change of temperature.

A change of a resistance value attributable to a change of temperature is compensated for using the second polymer line 230 adjacent to the first polymer line 220 as a reference. When the power source unit 620 supplies voltage of several V to the second conductive line 240, resistance values of the first polymer line 220 and the second polymer line 230 are identically increased according to a rise of temperature due to the supply of voltage as shown in FIG. 5(a). However, although the resistance values exceed a limit, the processor 610 determines a change of a resistance value attributable to a change of temperature as a normal operating state not oil leak.

In contrast, as shown in FIG. 5(b), when a resistance value of the second polymer line 230 not sensing oil leak is within a limit, but a resistance value of the first polymer line 220 exceeds the limit, the processor 610 determines that oil leak has occurred and thus outputs an alarm through the display unit 640 and the alarm generation unit 650.

Furthermore, the first polymer line 220 and the second polymer line 230 are formed in close proximity to the highest degree so that the same change of temperature is applied to the first polymer line 220 and the second polymer line 230.

Figure 6:
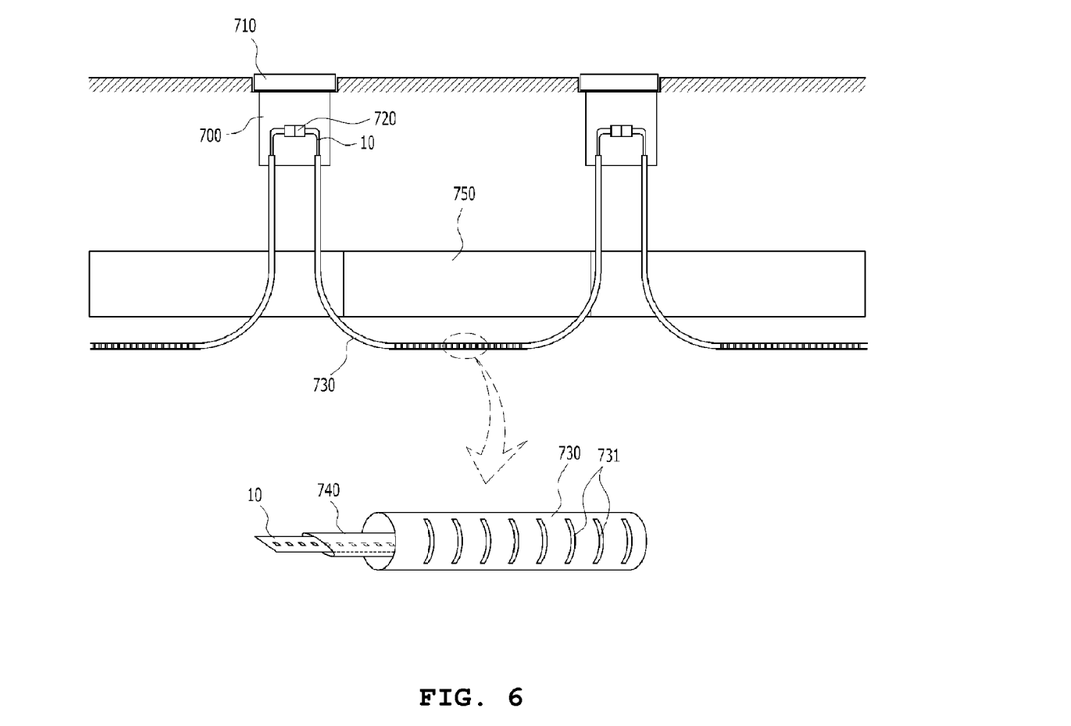
FIG. 6 is a diagram showing another embodiment of the present invention to which an oil pipeline is applied.

FIG. 6 is a diagram showing another embodiment of the present invention. The oil leak sensor 10 of the present invention is received within a flexible pipe 730 in which a plurality of inlet holes 731 through which oil enters is formed. Adsorption fabric 740 is placed within the pipe 730 in which the oil leak sensor 10 is received.

Furthermore, the pipe 730 is buried under an oil pipeline 750 buried in the ground and configured to sense oil leak generated from the oil pipeline 750. When oil is introduced through the inlet holes 731 of the pipe 730, the oil enters the oil leak sensor 10 through the adsorption fabric 740 and thus oil leak is sensed.

Both sides of the oil leak sensor 10 are introduced into the manhole 700 and are coupled by neighboring oil leak sensors and the connectors 720.

A cover 710 is installed over the manhole 700 in order to open or close the manhole 700. Accordingly, the oil leak sensor 10 and the connector 720 can be easily coupled.

Figure 7:
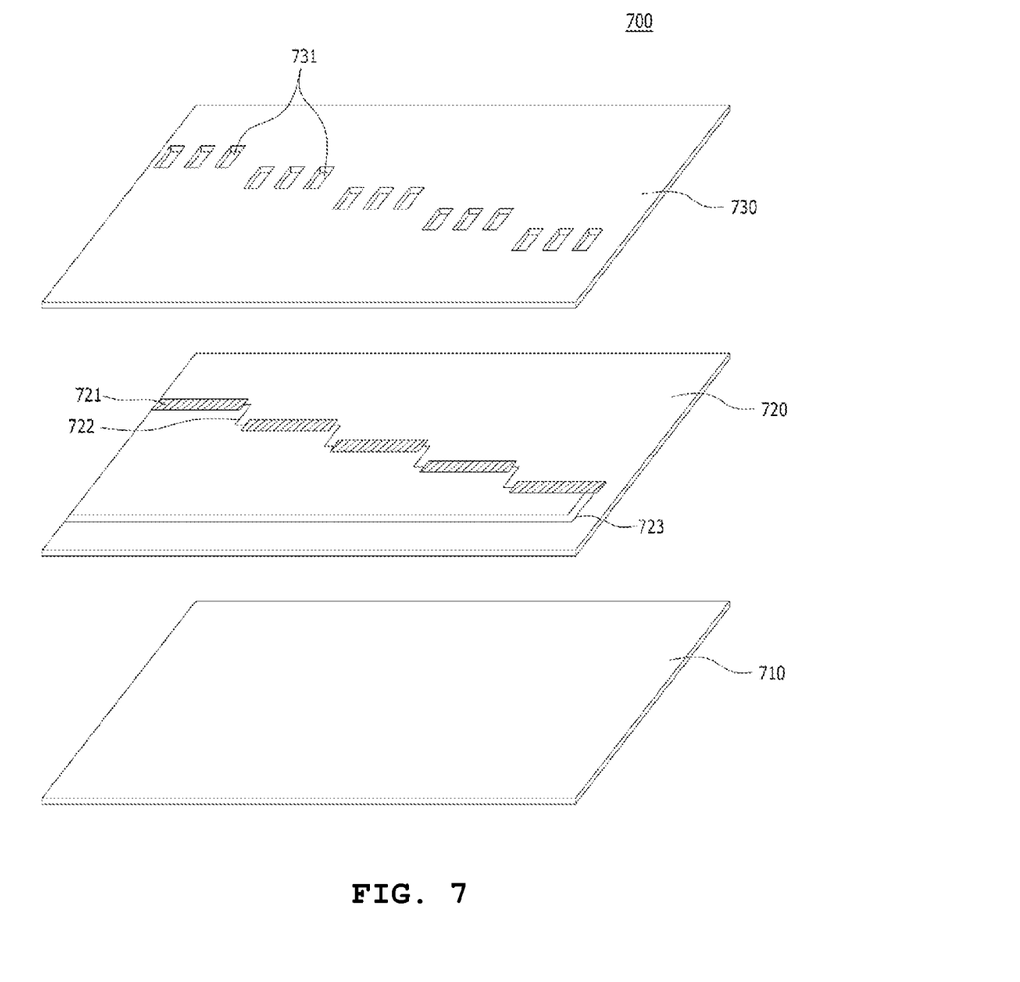
FIG. 7 is a diagram showing yet another embodiment of the present invention for detecting oil leak levels.

FIG. 7 is a diagram showing yet another embodiment of the present invention. Polymer lines 721 are diagonally formed on a top surface of a base layer 720 stepwise in a width direction. The base layer 720 is formed of a film. The polymer lines 721 are coupled by embedded lines 722 having electrical conductivity.

Furthermore, the polymer line 721 at the lowest is connected to a conductive line 723 and configured to receive sensing power from the controller 600.

The polymer line 721 at the highest is also connected to the controller 600 and configured to supply the controller 600 with a voltage value attributable to a change of a resistance value.

Figure 8:
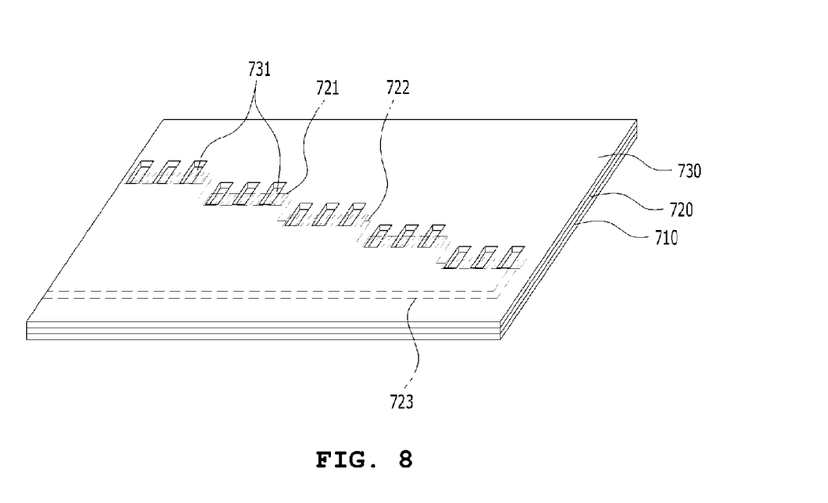
FIG. 8 is a diagram showing a positional relationship between a polymer line and holes.

An attachment layer 710 is stacked on a bottom surface of the base layer 720. An upper protection layer 730 is stacked on a top surface of the base layer 720. Sensing holes 731 are formed in the top surface of the base layer 720 so that the polymer lines 721 are externally exposed as in FIG. 8.

Figure 9:
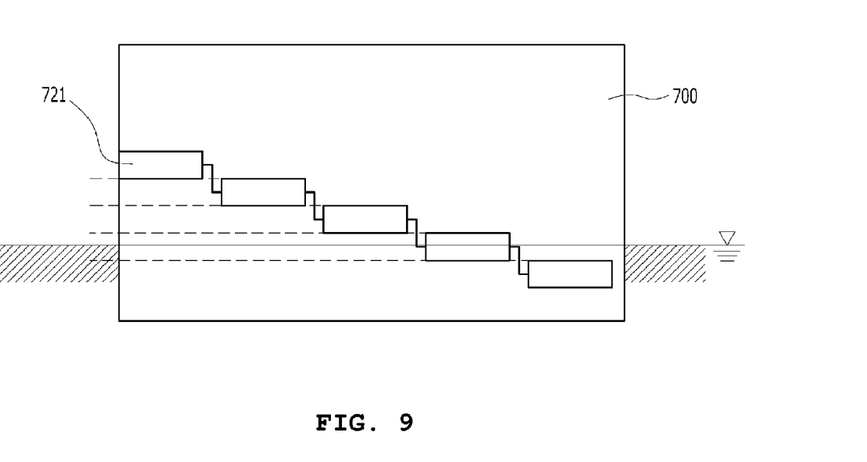
FIG. 9 is a diagram illustrating a state in which an oil leak level is detected.

Accordingly, as shown in FIG. 9, when the oil leak detection device is attached to the body of a wall in order to sense oil leak levels, the controller 600 is informed of a change in the resistance value of the polymer lines 721 at respective locations due to a change of an oil level.

The polymer lines 721 have the same width and length, and the lower end of one polymer line and the upper end of the other polymer line are placed on the same line. Accordingly, a continuous change of oil levels can be sensed based on a consecutive change of resistance values depending on the height of the polymer lines.

That is, if an oil leak sensor is lengthily installed upright and used as a water-level sensor as in the prior art, it is difficult to sense a continuous change of oil levels because of an interval between the sensing holes. However, the present invention is advantageous in that a consecutive change of oil levels can be sensed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An oil leak detection device, comprising:
   a base film layer configured in a tape form;
   a first polymer line and a second polymer line which are formed on a top surface of the base film layer in parallel in a length direction;
   a first conductive line and a second conductive line which are formed on the top surface of the base film layer in parallel to the first and second polymer lines in the length direction;
   an upper protection film layer attached to the top surface of the base film layer and configured to have a plurality of sensing holes formed at specific intervals in the length direction at locations through which only the first polymer line is exposed, and
   a controller determining whether there is oil leak,
   wherein:
   the second polymer line is a reference line in determining the oil leak, without being exposed through the sensing holes;
   when a resistance value of the first polymer line and a resistance value of the second polymer line are identically increased, the controller determines that there is no oil leak; and
   when the resistance value of the second polymer line is within a predetermined limit but the resistance value of the first polymer line exceeds the predetermined limit, the controller determines that there is oil leak and generates an alarm.

2. The oil leak detection device of claim 1, wherein the first and second polymer lines are formed in close proximity.

* * * * *